(12) United States Patent
Yamashita et al.

(10) Patent No.: US 11,469,700 B2
(45) Date of Patent: Oct. 11, 2022

(54) MOTOR AND ELECTRIC POWER STEERING DEVICE

(71) Applicant: Nidec Corporation, Kyoto (JP)

(72) Inventors: Yoshiaki Yamashita, Kyoto (JP); Hiromitsu Ohashi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 530 days.

(21) Appl. No.: 16/496,466

(22) PCT Filed: Mar. 9, 2018

(86) PCT No.: PCT/JP2018/009176
§ 371 (c)(1),
(2) Date: Sep. 23, 2019

(87) PCT Pub. No.: WO2018/180361
PCT Pub. Date: Oct. 4, 2018

(65) Prior Publication Data
US 2020/0373867 A1 Nov. 26, 2020

(30) Foreign Application Priority Data
Mar. 31, 2017 (JP) .............................. JP2017-070707

(51) Int. Cl.
*H02P 27/08* (2006.01)
*B62D 5/04* (2006.01)
*H02P 25/18* (2006.01)

(52) U.S. Cl.
CPC ............ *H02P 27/08* (2013.01); *B62D 5/0403* (2013.01); *B62D 5/0481* (2013.01); *H02P 25/182* (2013.01)

(58) Field of Classification Search
CPC .......... H02P 5/74; H02P 27/06; H02P 25/182; B62D 5/0403; B25F 5/00; H02M 7/48;
(Continued)

(56) References Cited

U.S. PATENT DOCUMENTS

2009/0026895 A1* 1/2009 Chakrabarti ............. H02K 3/28
310/198
2013/0026968 A1* 1/2013 Tagome .................. H02P 25/22
318/724
(Continued)

FOREIGN PATENT DOCUMENTS

| JP | 2008-219956 A | 9/2008 |
| JP | 2014-192950 A | 10/2014 |
| JP | 2017-055488 A | 3/2017 |

*Primary Examiner* — Said Bouziane
(74) *Attorney, Agent, or Firm* — Keating & Bennett

(57) ABSTRACT

A motor includes a first inverter electrically connected to a first end of a winding of each phase, and a second inverter electrically connected to a second end of the winding of each phase. Each of the first and second inverters includes low-side switching elements and high-side switching elements. FETs of the first inverter are electrically connected to a first end of a U-phase winding. FETs of the second inverter are electrically connected to a second end of the U-phase winding. At least a portion of a current flowing from one of the FETs of the first inverter to the U-phase winding flows to one of the FETs of the second inverter. One of the FETs of the first inverter and one of the FETs of the second inverter are adjacent to each other.

10 Claims, 15 Drawing Sheets

(58) Field of Classification Search
CPC ........ H02M 1/14; H02M 7/521; H02M 7/537; H02M 7/487; H02M 1/12
See application file for complete search history.

(56) References Cited

U.S. PATENT DOCUMENTS

| | | | |
|---|---|---|---|
| 2014/0002002 A1* | 1/2014 | Barza | H02P 25/22 318/724 |
| 2015/0236634 A1* | 8/2015 | Han | H02P 5/74 318/504 |
| 2017/0133960 A1* | 5/2017 | Takahashi | H02P 25/022 |
| 2020/0023886 A1 | 1/2020 | Yatsugi et al. | |

* cited by examiner

MOTOR AND ELECTRIC POWER STEERING DEVICE

CROSS REFERENCE TO RELATED APPLICATIONS

This is a U.S. national stage of PCT Application No. PCT/JP2018/009176, filed on Mar. 9, 2018, and priority under 35 U.S.C. § 119(a) and 35 U.S.C. § 365(b) is claimed from Japanese Application No. 2017-070707, filed Mar. 31, 2017; the entire disclosures of each application are hereby incorporated herein by reference.

FIELD OF THE INVENTION

The present disclosure relates to a motor and an electric power steering device.

BACKGROUND

In general, an electric motor (hereinafter, simply referred to as "motors") such as a brushless DC motor and an alternating current synchronous motor is driven by three-phase currents. A complex control technology such as vector control is used in order to accurately control current waveforms of the three-phase currents. In such a control technology, an advanced mathematical arithmetic operation is required, and a digital arithmetic circuit such as a microcontroller (microcomputer) is used. The vector control technology is utilized in fields such as washing machines, electric-assisted bicycles, electric scooters, electric power steering devices, electric vehicles, and industrial equipment where a fluctuation in a load of the motor is large. Meanwhile, another motor control method such as a pulse width modulation (PWM) method is adopted in a motor with a relatively small output.

In an in-vehicle field, an electrical control unit (ECU) is used for a vehicle. The ECU includes a microcontroller, a power supply, an input and output circuit, an AD converter, a load drive circuit, and a read only memory (ROM). An electronic control system is constructed with the ECU as a core. For example, the ECU processes a signal from a sensor, and controls an actuator such as the motor. Specifically, the ECU controls an inverter in a power conversion device while monitoring a rotational speed and a torque of the motor. The power conversion device converts a drive power supplied to the motor under the control of the ECU.

In recent years, an electromechanical motor in which the motor, the power conversion device, and the ECU are integrated has been developed. Particularly, high quality assurance is required in the in-vehicle field from the viewpoint of safety. Thus, a redundant design capable of continuing a safe operation even though a failure occurs in a part of components is adopted. As an example of the redundant design, it is considered that two power conversion devices are provided for one motor. As another example, it is considered that a backup microcontroller is provided in a main microcontroller.

For example, a related art discloses a power conversion device that includes a control unit and two inverters and converts a power to be supplied to a three-phase motor. Each of two inverters is connected to a power supply and a ground (hereinafter, referred to as "GND"). One inverter is connected to one end of each of the three-phase windings of the motor, and the other inverter is connected to the other end of each of the three-phase windings. Each inverter includes a bridge circuit constituted by three legs including high-side switching elements and low-side switching elements.

The control unit drives the motor by performing three-phase energization control by using both of two inverters. The control unit performs the three-phase energization control by performing control such that the switching element of one inverter and the switching element of the other inverter are switched in opposite phases.

When a failure in the switching elements of two inverters is detected, the control unit switches motor control from normal control to abnormal control. In the present specification, "abnormal" mainly means a failure of the switching element. Further, the "normal control" means control in a state in which all the switching elements are normal, and the "abnormal control" means control in a state in which a failure occurs in a certain switching element.

In the abnormal control, a neutral point of a winding is formed in the inverter (hereinafter, referred to as a "failure inverter") of two inverters including the failure switching element by turning on and off the switching elements according to a predetermined rule. According to this rule, for example, when an open failure in which the high-side switching elements are constantly turned off occurs, in the bridge circuit of the inverter, the switching element of three high-side switching elements other than the faulty switching element is turned off, and the three low-side switching elements are turned on. In this case, the neutral point is formed on the low side. Alternatively, when a short circuit failure in which the high-side switching elements are constantly turned on occurs, in the bridge circuit of the inverter, the switching element of three high-side switching elements other than the failure switching element is turned on, and three low-side switching elements are turned off. In this case, the neutral point is formed on the high side. According to the power conversion device of the related art, the neutral points of the three-phase windings are formed in the failure inverter during abnormality. Even though the failure occurs in the switching element, the motor drive can be continued by using the normal inverter.

SUMMARY

In accordance with example embodiments of the present disclosure, drive currents that drive the motor flow through two inverters. A magnetic field is generated around the two inverters through which the drive currents flow. Electronic components included in the motor operate under the influence of such a magnetic field.

Example embodiments of the present disclosure provide motors that each reduce or prevent influence of a magnetic field generated by a drive current on a surrounding electronic component, and also provide electric power steering devices including the motors.

A motor of an example embodiment of the present disclosure includes n-phase windings (n is an integer of 3 or more), a first inverter that is electrically connected to a first end of each of the n-phase windings, and a second inverter that is electrically connected to a second end of each of the n-phase windings. Each of the first inverter and the second inverter includes a plurality of low-side switching elements and a plurality of high-side switching elements. The n-phase windings include a first-phase winding, a first low-side switching element and a first high-side switching element of the first inverter are electrically connected to a first end of the first-phase winding, a second low-side switching element and a second high-side switching element of the second inverter are electrically connected to a second end of the first-phase winding. At least a portion of a current flowing from the first high-side switching element of the first inverter to the first-phase winding flows to the second low-side switching element of the second inverter. The first high-side switching element of the first inverter and the second low-side switching element of the second inverter are adjacent to each other.

According to the example embodiments of the present disclosure, it is possible to reduce or prevent influence of the magnetic fields generated by the drive currents on the surrounding electronic components.

The above and other elements, features, steps, characteristics and advantages of the present disclosure will become more apparent from the following detailed description of the example embodiments with reference to the attached drawings.

DETAILED DESCRIPTION

The discoveries of the inventor of the present application on which the present disclosure is based will be described before example embodiments of the present disclosure are described.

For example, in an electromechanical motor, a rotation angle of a rotor is detected using a magnetic sensor such as a magneto-resistive element and a Hall sensor. The magnetic sensor detects the rotation angle of the motor by detecting a magnetic field changing with the rotation of the rotor.

Drive currents for driving the motor flow through two inverters. A magnetic field is generated around two inverters through which the drive currents flow. Electronic components included in the motor operate under the influence of such a magnetic field. That is, the magnetic sensor detects the rotation angle of the rotor while being influenced by the magnetic field generated around two inverters, and the detection accuracy of the rotation angle may be decreased. When the detection accuracy of the rotation angle is low in the electromechanical motor, torque ripple may increase, or a reduction in output may decrease.

There is a need for a motor that reduces the influence of the magnetic field generated by the drive current of the motor on surrounding electronic components.

Hereinafter, example embodiments of the motor and the electric power steering device of the present disclosure will be described in detail with reference to the attached drawings. However, unnecessary detailed description may be omitted. For example, detailed description of already well-known matters and redundant description of substantially the same configuration may be omitted. By doing this, it is possible to avoid unnecessary redundancy in the following description, and it is possible to facilitate easier understanding of the example embodiments by those skilled in the art.

In the present specification, the example embodiments of the present disclosure will be described in conjunction with an example in which a three-phase motor including three-phase (U-phase, V-phase, and W-phase) windings is used. However, an n-phase motor having n-phases windings (n is an integer of 3 or more) such as four-phase and five-phase windings is included in the scope of the present disclosure.

Figure 1:
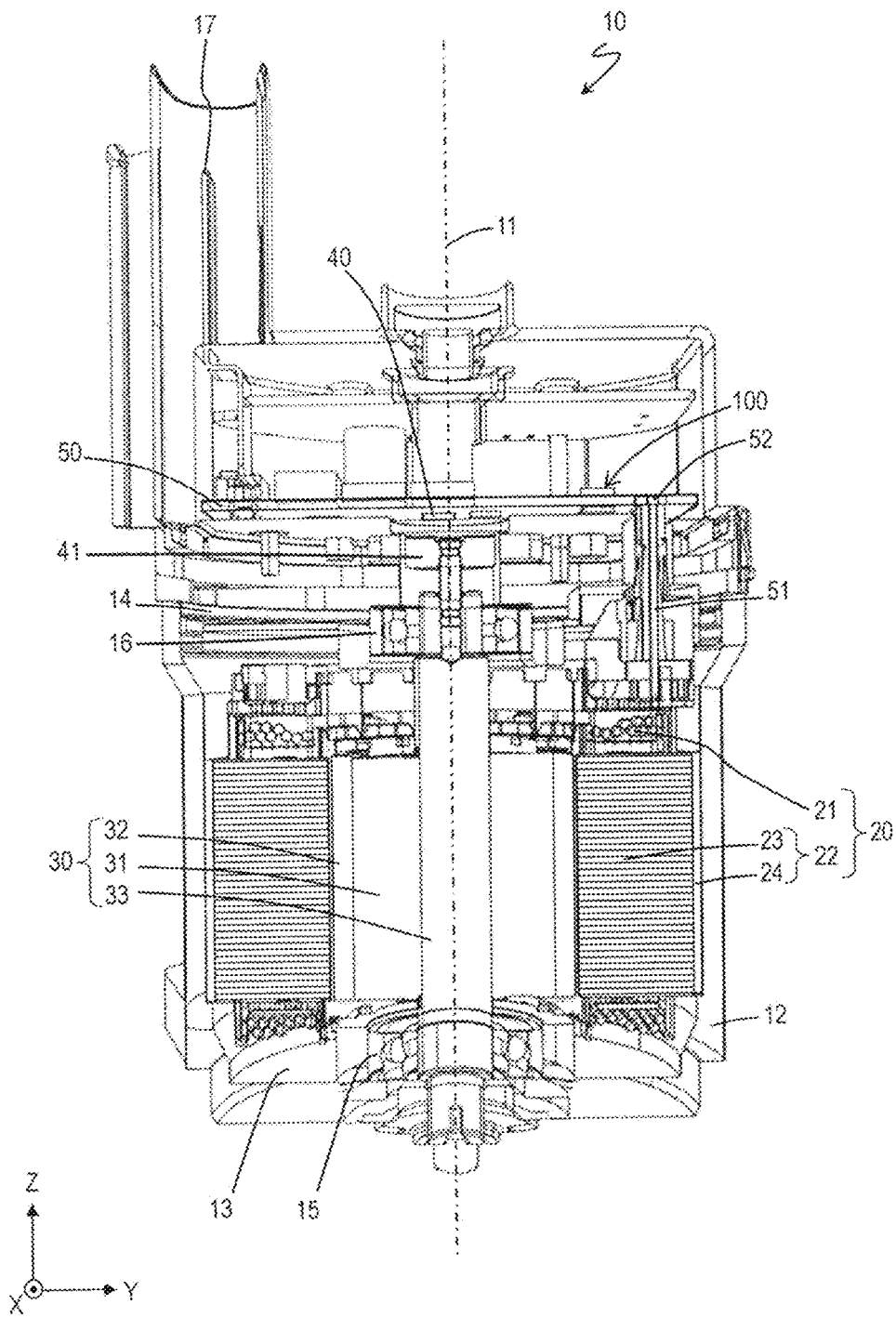
FIG. 1 is a schematic diagram illustrating a structure of a motor according to an example embodiment of the present disclosure.

FIG. 1 is a diagram illustrating a structure of a motor 10 according to the present example embodiment. FIG. 1 illustrates the inside of the motor 10 when cut along a central axis 11.

The motor 10 is an electromechanical motor. The motor 10 is mounted on, for example, a vehicle and is used as a motor for an electric power steering device. In this case, the motor 10 generates a driving force of the electric power steering device.

The motor 10 includes a stator 20, a rotor 30, a housing 12, a partition 14, a bearing 15, and a bearing 16. The stator 20 is also referred to as an armature. The central axis 11 is a rotation axis of the rotor 30.

The housing 12 is a substantially cylindrical body having a bottom, and accommodates the stator 20, the bearing 15, and the rotor 30 therein. A recessed portion 13 which holds the bearing 15 is present at the center of the bottom of the housing 12. The partition 14 is a plate-like member that closes an opening at an upper portion of the housing 12. The partition 14 holds the bearing 16 at a central portion thereof.

The stator 20 has an annular shape and has a laminate 22 and a winding 21. The laminate 22 is also referred to as an annular laminated core. The winding is also referred to as a coil. The stator 20 generates a magnetic flux in response to a drive current. The laminate 22 is made of a laminated steel plate obtained by laminating a plurality of steel plates in a direction (Z direction of FIG. 1) along the central axis 11. The laminate 22 includes an annular laminated core back 24 and a plurality of laminated teeth 23. The laminated core back 24 is fixed to an inner wall of the housing 12.

The winding 21 is made of a conductive material such as copper, and is typically attached to the plurality of laminated teeth 23 of the laminate 22.

The rotor 30 includes a rotor core 31, a plurality of permanent magnets 32 provided along an outer circumference of the rotor core 31, and a shaft 33. The rotor core 31 is made of, for example, a magnetic material such as iron, and has a tubular shape. The plurality of permanent magnets 32 is provided such that N and S poles alternately appear in a circumferential direction of the rotor core 31. The shaft 33 is fixed at the center of the rotor core 31 and extends in an up-down direction (Z direction) along the central axis 11. In addition, up, down, left, and right directions in the present specification refer to up, down, left, and right directions when the motor 10 illustrated in FIG. 1 is viewed, and the example embodiment is described using these directions in order to facilitate easier understanding of the example embodiment. The up, down, left, and right directions in the present specification do not necessarily coincide with up, down, left, and right directions in a state in which the motor 10 is mounted on an actual product (vehicle).

The bearings 15 and 16 rotatably support the shaft 33 of the rotor 30. The bearings 15 and 16 are, for example, ball bearings that rotate an outer ring and an inner ring relative to each other via a ball. FIG. 1 illustrates the ball bearing.

In the motor 10, when the drive current is applied to the winding 21 of the stator 20, the magnetic flux in a radial direction is generated in the plurality of laminated teeth 23 of the laminate 22. Torque is caused in the circumferential direction by the action of the magnetic flux between the plurality of laminated teeth 23 and permanent magnets 32, and the rotor 30 rotates with respect to the stator 20. For example, when the rotor 30 rotates, the driving force is generated in the electric power steering device.

A permanent magnet 41 is fixed to an end portion of the shaft 33 on the partition 14 side. The permanent magnet 41 is rotatable with the rotor 30. A substrate 50 is disposed at an upper portion of the partition 14. A power conversion device 100 is mounted on the substrate 50. The partition 14 separates a space in which the stator 20 and the rotor 30 within the motor 10 are accommodated and a space in which the substrate 50 is accommodated.

The power conversion device 100 converts a power from a power supply into a power to be supplied to the winding 21 of the stator 20. Terminals 52 of inverters included in the power conversion device 100 are provided at the substrate 50. An electrical wire 51 is connected to the terminals 52. The electrical wire 51 is, for example, an end portion of the winding 21. The electrical wire 51 and the winding 21 may be separate members. A power output from the power conversion device 100 is supplied to the winding 21 via the electrical wire 51. Details of the power conversion device 100 will be described below.

A magnetic sensor 40 is provided at the substrate 50. The magnetic sensor 40 is disposed at a position facing the permanent magnet 41 fixed to the shaft 33. The magnetic sensor 40 is disposed on the central axis 11 of the shaft 33.

The magnetic sensor 40 is, for example, a magneto-resistive element or a Hall element. The magnetic sensor 40 can detect a rotation angle of the rotor 30 by detecting a magnetic field generated from the permanent magnet 41 rotating with the shaft 33.

The motor 10 is connected to a battery and various control devices on the outside of the motor 10 through a plurality of terminals 17. The plurality of terminals 17 include a power supply terminal to which a power is supplied from an external power supply, and a signal terminal for transmitting and receiving data to and from an external device.

Next, details of the power conversion device 100 will be described.

Figure 2:
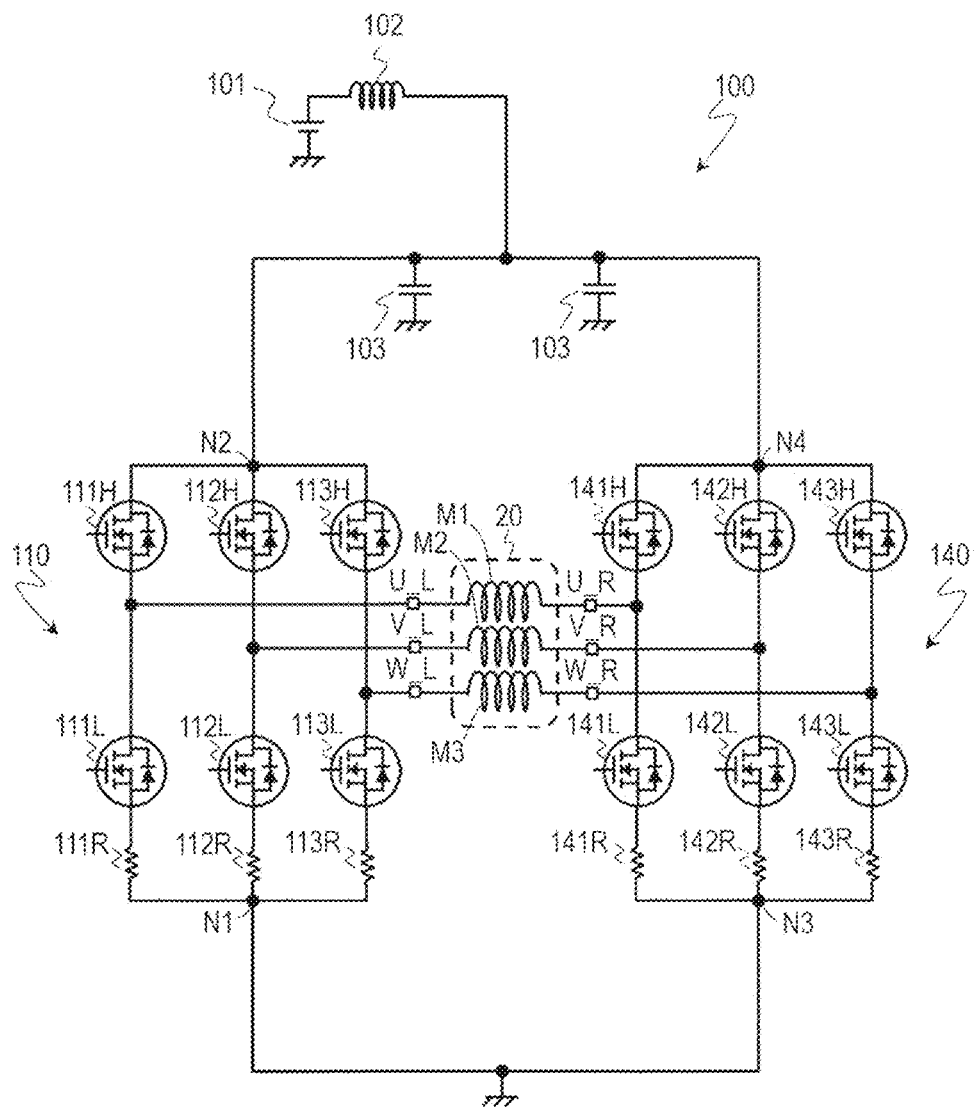
FIG. 2 is a schematic diagram illustrating a circuit configuration of a power conversion device according to an example embodiment of the present disclosure.

FIG. 2 illustrates a schematic circuit configuration of the power conversion device 100 according to the present example embodiment.

The power conversion device 100 includes a first inverter 110 and a second inverter 140. In addition, the power conversion device 100 includes a control circuit 300 illustrated in FIG. 6.

As the winding 21 (FIG. 1), a U-phase winding M1, a V-phase winding M2, and a W-phase winding M3 are wound around the stator 20. The windings of the respective phases are connected to the first inverter 110 and the second inverter 140. Specifically, the first inverter 110 is connected to one end of the winding of each phase, and the second inverter 140 is connected to the other end of the winding of each phase. In the present specification, "connection" between components (constituent elements) mainly means electrical connection.

The first inverter 110 has terminals U_L, V_L, and W_L corresponding to the respective phases, as the terminals 52 (FIG. 1). The second inverter 140 has terminals U_R, V_R, and W_R corresponding to the respective phases, as the terminals 52. The terminal U_L of the first inverter 110 is connected to one end of the U-phase winding M1, the terminal V_L is connected to one end of the V-phase winding M2, and the terminal W_L is connected to one end of the W-phase winding M3. Similar to the first inverter 110, the terminal U_R of the second inverter 140 is connected to the other end of the U-phase winding M1, the terminal V_R is connected to the other end of the V-phase winding M2, and the terminal W_R is connected to the other end of the W-phase winding M3. Such connections are different from so-called star connection and delta connection.

In the power conversion device 100, the first inverter 110 and the second inverter 140 are connected to a power supply 101 and GND. The motor 10 including the power conversion device 100 may be connected to an external power supply via, for example, the terminal 17 (FIG. 1).

In the present specification, the first inverter 110 may be referred to as a "bridge circuit L". In addition, the second inverter 140 may be referred to as a "bridge circuit R". Each of the first inverter 110 and the second inverter 140 includes three legs including low-side switching elements and high-side switching elements. The plurality of switching elements constituting these legs constitute a plurality of H bridges between the first inverter 110 and the second inverter 140 via the windings.

The first inverter 110 includes a bridge circuit constituted by three legs. Switching elements 111L, 112L, and 113L illustrated in FIG. 2 are low-side switching elements, and switching elements 111H, 112H, and 113H are high-side switching elements. For example, a field effect transistor (typically, MOSFET) or an insulated-gate bipolar transistor (IGBT) can be used as the switching element. In the present specification, an example in which FET is used as the switching element of the inverter is described, and in the following description, the switching element may be referred to as FET. For example, the switching element 111L is referred to as a FET 111L.

The first inverter 110 includes three shunt resistors 111R, 112R, and 113R, as current sensors (see FIG. 6) for detecting currents flowing in the windings of the U, V, and W phases. A current sensor 170 includes a current detection circuit (not illustrated) that detects currents flowing in each shunt resistor. For example, the shunt resistors 111R, 112R, and 113R are connected between three low-side switching elements included in three legs of the first inverter 110 and the GND. Resistance value of the shunt resistor is, for example, about 0.5 mΩ to about 1.0 mΩ.

Similar to the first inverter 110, the second inverter 140 includes a bridge circuit constituted by three legs. FETs 141L, 142L, and 143L illustrated in FIG. 2 are low-side switching elements, and FETs 141H, 142H, and 143H are high-side switching elements. In addition, the second inverter 140 includes three shunt resistors 141R, 142R, and 143R. These shunt resistors are connected between three low-side switching elements included in three legs and the GND. Each FET of the first and second inverters 110 and 140 may be controlled by, for example, a microcontroller or a dedicated driver.

Figure 3:
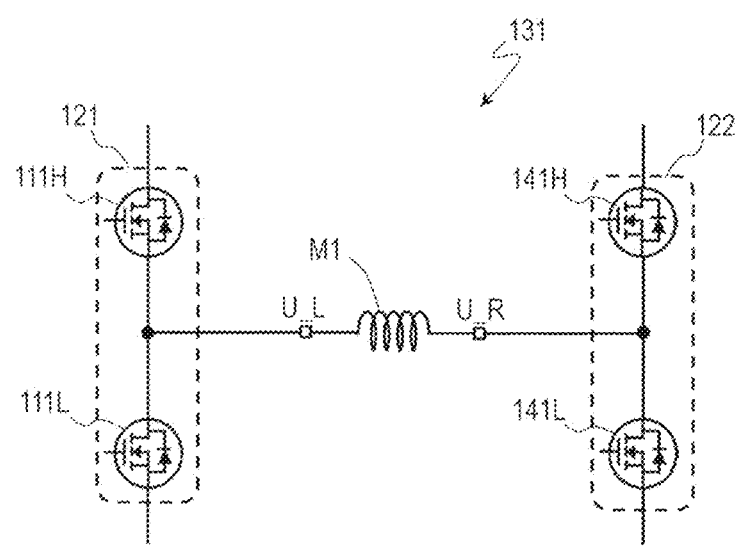
FIG. 3 is a diagram illustrating an H bridge included in a power conversion device according to an example embodiment of the present disclosure.
Figure 4:
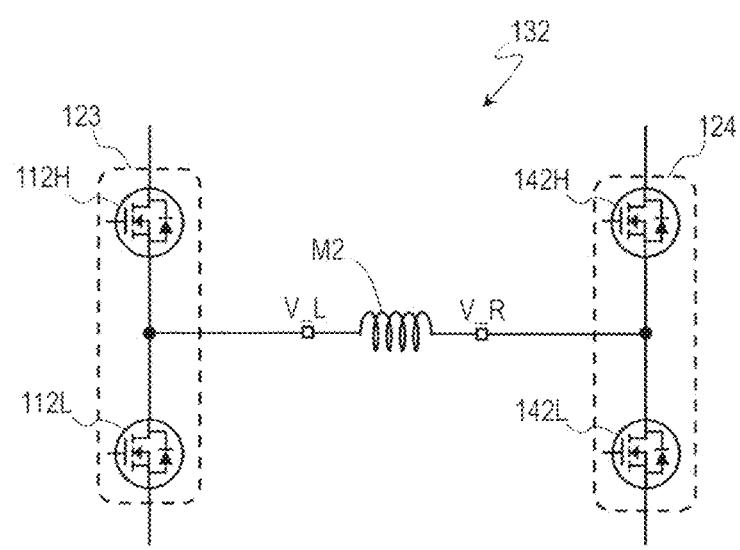
FIG. 4 is a diagram illustrating the H bridge included in a power conversion device according to an example embodiment of the present disclosure.
Figure 5:
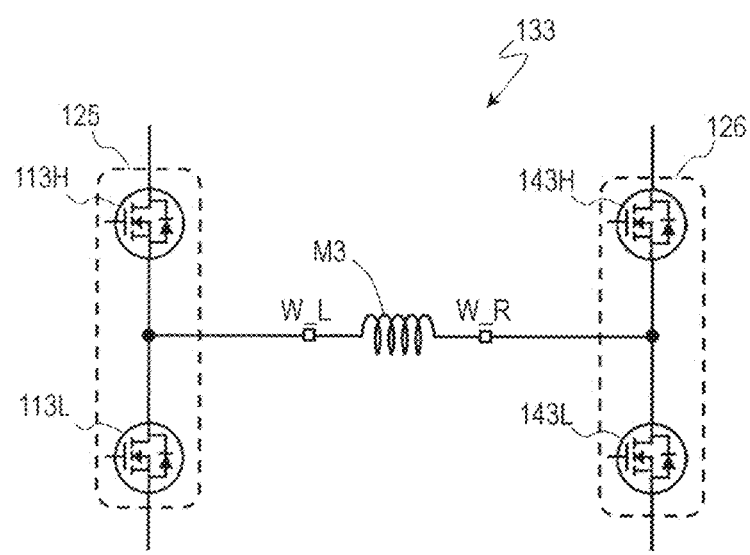
FIG. 5 is a diagram illustrating the H bridge included in a power conversion device according to an example embodiment of the present disclosure.

FIGS. 3, 4, and 5 are diagrams illustrating three H bridges 131, 132, and 133 included in the power conversion device 100.

The first inverter 110 includes legs 121, 123, and 125. The leg 121 includes the FET 111H and the FET 111L. The leg 123 includes the FET 112H and the FET 112L. The leg 125 includes the FET 113H and the FET 113L.

The second inverter 140 has legs 122, 124, and 126. The leg 122 includes the FET 141H and the FET 141L. The leg 124 includes the FET 142H and the FET 142L. The leg 126 includes the FET 143H and the FET 143L.

The H bridge 131 illustrated in FIG. 3 includes the leg 121, the winding M1, and the leg 122. The H bridge 132 illustrated in FIG. 4 includes the leg 123, the winding M2, and the leg 124. The H bridge 133 illustrated in FIG. 5 includes the leg 125, the winding M3, and the leg 126.

The power supply 101 (FIG. 2) generates a predetermined power supply voltage. A power is supplied from the power supply 101 to the first and second inverters 110 and 140. For example, a direct current power supply is used as the power supply 101. However, the power supply 101 may be an AC-DC converter or a DC-DC converter, or may be a battery (storage battery). The power supply 101 may be a single power supply common to the first and second inverters 110 and 140, or may include a first power supply for the first inverter 110 and a second power supply for the second inverter 140.

A coil 102 is provided between the power supply 101 and the power conversion device 100. The coil 102 functions as a noise filter, and smooths high-frequency noise included in a voltage waveform to be supplied to each inverter or high-frequency noise generated in each inverter such that these high-frequency noises do not flow to the power supply 101. In addition, one end of a capacitor 103 is connected between the power supply 101 and the power conversion device 100. The other end of the capacitor 103 is connected to the GND. The capacitor 103 is a so-called bypass capacitor, and suppresses a voltage ripple. The capacitor 103 is, for example, an electrolytic capacitor, and the capacitance and the number of the capacitor to be used are appropriately determined depending on design specifications.

FIG. 2 illustrates a configuration in which one shunt resistor is disposed in each leg of each inverter. The first and second inverters 110 and 140 may include six or less shunt resistors. Six or less shunt resistors may be connected between six or less low-side switching elements of six legs included in the first and second inverters 110 and 140 and the GND. Further, when this motor extends into an n-phase motor, the first and second inverters 110 and 140 may include 2n or less shunt resistors. 2n or less shunt resistors may be connected between 2n or less low-side switching elements of 2n legs of the first and second inverters 110 and 140 and the GND.

Figure 6:
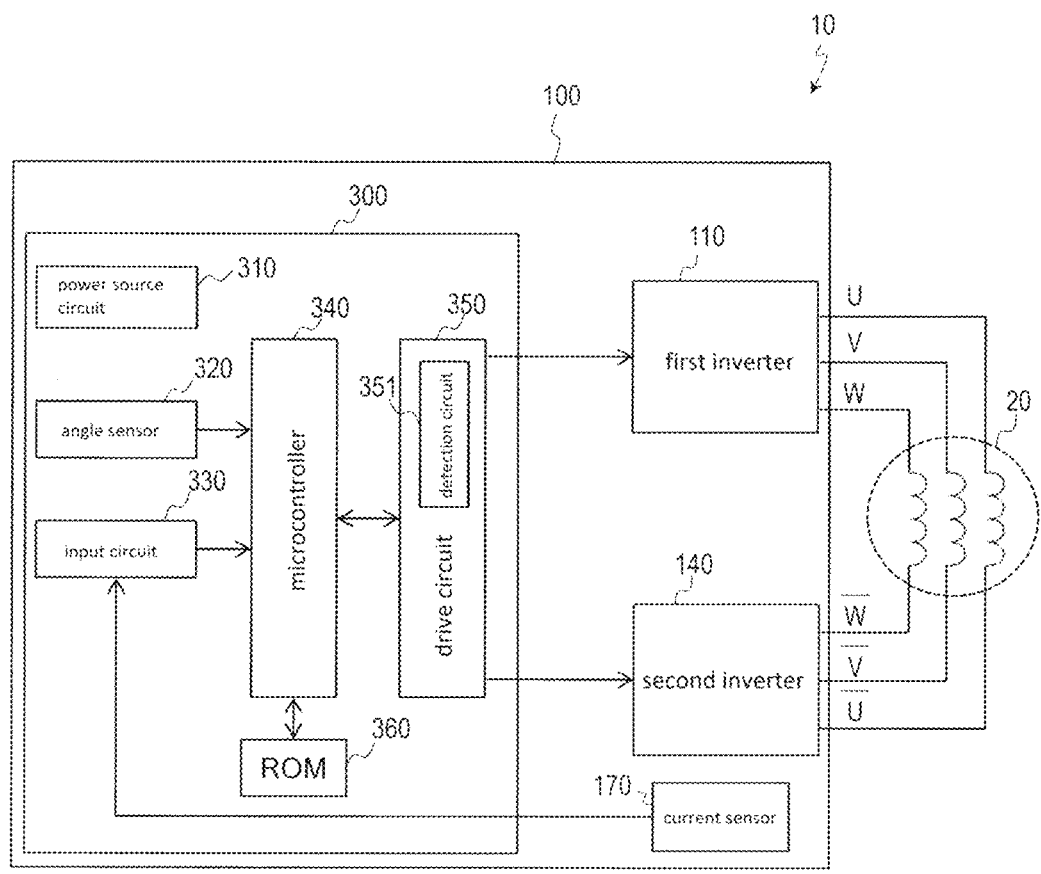
FIG. 6 is a block diagram illustrating a motor including a power conversion device according to an example embodiment of the present disclosure.

FIG. 6 illustrates a schematic block configuration of the motor 10 including the power conversion device 100. The power conversion device 100 includes the control circuit 300.

The control circuit 300 includes, for example, a power supply circuit 310, an angle sensor 320, an input circuit 330, a microcontroller 340, a drive circuit 350, and a ROM 360. In this example, the angle sensor 320 is the magnetic sensor 40 (FIG. 1). The control circuit 300 controls the rotation of the motor 10 by controlling the overall operation of the power conversion device 100. Specifically, the control circuit 300 can implement closed loop control by controlling a target position, a rotational speed, and a current of the rotor. The control circuit 300 may include a torque sensor. In this case, the control circuit 300 can control a target motor torque.

The power supply circuit 310 generates DC voltages (for example, 3 V and 5 V) required in each block within the circuit. The angle sensor 320 is, for example, a magneto-resistive element, a resolver, or a Hall IC. The angle sensor 320 detects the rotation angle of the rotor 30 (hereinafter, referred to as a "rotation signal"), and outputs the rotation signal to the microcontroller 340. The input circuit 330 receives a motor current value (hereinafter, referred to as an "actual current value") detected by the current sensor 170, converts a level of the actual current value into an input level of the microcontroller 340 as necessary, and outputs the actual current value to the microcontroller 340.

The microcontroller 340 controls a switching operation (turning on or off) of each FET of the first inverter 110 and the second inverter 140. The microcontroller 340 sets a target current value according to the actual current value and the rotation signal of the rotor, generates a PWM signal, and outputs the generated PWM signal to the drive circuit 350.

The drive circuit 350 is typically a gate driver. The drive circuit 350 generates a control signal (gate control signal) for controlling the switching operation of each FET in the first and second inverters 110 and 140 according to the PWM signal, and supplies the control signal to a gate of each FET. The microcontroller 340 may have a function of the drive circuit 350. In this case, the control circuit 300 may not include the drive circuit 350.

The ROM 360 is, for example, a writable memory, a rewritable memory, or a read-only memory. The ROM 360 stores a control program including a command group for causing the microcontroller 340 to control the power conversion device 100. For example, the control program is temporarily developed into a RAM (not illustrated) during booting.

The control circuit 300 drives the motor 10 by performing three-phase energization control by using both the first and second inverters 110 and 140. Specifically, the control circuit 300 performs the three-phase energization control by performing control such that the FET of the first inverter 110 and the FET of the second inverter 140 are switched in opposite phases (phase difference=180°). For example, in the case of the H bridge including the FETs 111L, 111H, 141L, and 141H, when the FET 111L is turned on, the FET 141L is turned off, and when the FET 111L is turned off, the FET 141L is turned on. Similarly, when the FET 111H is turned on, the FET 141H is turned off, and when the FET 111H is turned off, the FET 141H is turned on. The current output from the power supply 101 flows to the GND through the high-side switching elements, the windings, and the low-side switching elements. The connection in the power conversion device 100 may be referred to as an open connection.

Here, a path of the current flowing through the U-phase winding M1 will be described. When the FET 111H and the FET 141L are turned on and the FET 141H and the FET 111L are turned off, the current flows in order of the power supply 101, the FET 111H, the winding M1, the FET 141L, and the GND. When the FET 141H and the FET 111L are turned on and the FET 111H and the FET 141L are turned off, the current flows in order of the power supply 101, the FET 141H, the winding M1, the FET 111L, and the GND.

A part of the current flowing from the FET 111H to the winding M1 may flow to the FET 141H. That is, the current flowing from the FET 111H to the winding M1 may branch into and flow to the FET 141L and the FET 141H. For example, a ratio of a current flowing to the FET 141H to the current flowing from the FET 111H to the winding M1 during low-speed rotation of the motor 10 may be larger than a current ratio during high-speed rotation.

Similarly, a part of the current flowing from the FET 141H to the winding M1 may flow to the FET 111H. For example, a ratio of a current flowing to the FET 111H to the current flowing from the FET 141H to the winding M1 during the low-speed rotation of the motor 10 may be larger than a current ratio during the high-speed rotation.

Next, a path of the current flowing through the V-phase winding M2 will be described. When the FETs 112H and 142L are turned on and the FETs 142H and 112L are turned off, the current flows in order of the power supply 101, the FET 112H, the winding M2, the FET 142L, and the GND. When the FET 142H and the FET 112L are turned on and the FET 112H and the FET 142L are turned off, the current flows in order of the power supply 101, the FET 142H, the winding M2, the FET 112L, and the GND.

A part of the current flowing from the FET 112H to the winding M2 may flow to the FET 142H. For example, a ratio of a current flowing to the FET 142H to the current flowing from the FET 112H to the winding M2 during the low-speed rotation of the motor 10 may be larger than a current ratio during the high-speed rotation.

Similarly, a part of the current flowing from the FET 142H to the winding M2 may flow to the FET 112H. For example, a ratio of a current flowing to the FET 112H to the current flowing from the FET 142H to the winding M2 during the low-speed rotation of the motor 10 may be greater than a current ratio during the high-speed rotation.

Next, a path of the current flowing through the W-phase winding M3 will be described. When the FET 113H and the FET 143L are turned on and the FET 143H and the FET 113L are turned off, the current flows in order of the power supply 101, the FET 113H, the winding M3, the FET 143L, and the GND. When the FET 143H and the FET 113L are turned on and the FET 113H and the FET 143L are turned off, the current flows in order of the power supply 101, the FET 143H, the winding M3, the FET 113L, and the GND.

A part of the current flowing from the FET 113H to the winding M3 may flow to the FET 143H. For example, a ratio of a current flowing to the FET 143H to the current flowing from the FET 113H to the winding M3 during the low-speed rotation of the motor 10 may be larger than a current ratio during the high-speed rotation.

Similarly, a part of the current flowing from the FET 143H to the winding M3 may flow to the FET 113H. For example, a ratio of a current flowing to the FET 113H to the current flowing from the FET 143H to the winding M3 during the low-speed rotation of the motor 10 may be larger than a current ratio during the high-speed rotation.

Figure 7:
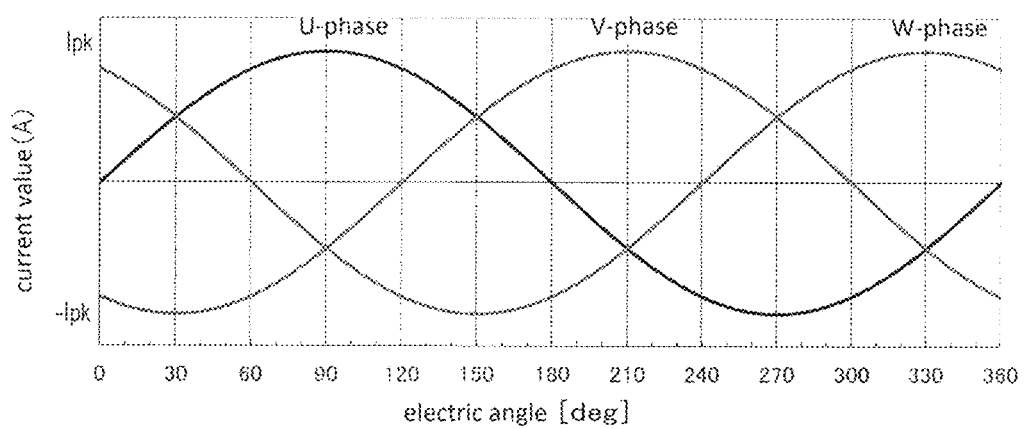
FIG. 7 is a diagram illustrating current waveforms obtained by plotting current values flowing to U-phase, V-phase, and W-phase windings of the motor when the power conversion device is controlled according to normal three-phase energization control according to an example embodiment of the present disclosure.

FIG. 7 illustrates current waveforms (sine waves) obtained by plotting current values flowing in the U-phase, the V-phase, and the W-phase windings when the power conversion device 100 is controlled according to normal three-phase energization control. A horizontal axis indicates a motor electrical angle (deg), and a vertical axis indicates a current value (A). In the current waveforms of FIG. 7, the current values are plotted for every electrical angle of 30°. Ipk indicates a maximum current value (peak current value) of each phase.

Table 1 represents the current values flowing to the terminals of the inverters for every electrical angle in the sine waves of FIG. 7. Specifically, Table 1 represents the current values flowing to the terminals U_L, V_L, and W_L of the first inverter 110 (bridge circuit L) for every electrical angle of 30°, and the current values flowing to the terminals U_R, V_R, and W_R of the second inverter 140 (bridge circuit R) for every electrical angle of 30°. Here, for the bridge circuit L, the direction of the current flowing from the terminal of the bridge circuit L to the terminal of the bridge circuit R is defined as a positive direction. An orientation of the current illustrated in FIG. 7 follows this definition. Further, for the bridge circuit R, the direction of the current flowing from the terminal of the bridge circuit R to the terminal of the bridge circuit L is defined as a positive direction. Therefore, a phase difference between the current of the bridge circuit L and the current of the bridge circuit R is 180°. In Table 1, a value of a current value $I_1$ is $[(3)1/2/2]*Ipk$, and a value of a current value $I_2$ is $Ipk/2$.

TABLE 1

| | | electrical angle [deg] | | | | | | | | | | | |
|---|---|---|---|---|---|---|---|---|---|---|---|---|---|
| normal state | | 0 (360) | 30 | 60 | 90 | 120 | 150 | 180 | 210 | 240 | 270 | 300 | 330 |
| bridge circuit L | U_L | 0 | $I_2$ | $I_1$ | Ipk | $I_1$ | $I_2$ | 0 | $-I_2$ | $-I_1$ | $-Ipk$ | $-I_1$ | $-I_2$ |
| | V_L | $-I_1$ | $-Ipk$ | $-I_1$ | $-I_2$ | 0 | $I_2$ | $I_1$ | Ipk | $I_1$ | $I_2$ | 0 | $-I_2$ |
| | W_L | $I_1$ | $I_2$ | 0 | $-I_2$ | $-I_1$ | $-Ipk$ | $-I_1$ | $-I_2$ | 0 | $I_2$ | $I_1$ | Ipk |
| bridge circuit R | U_R | 0 | $-I_2$ | $-I_1$ | $-Ipk$ | $-I_1$ | $-I_2$ | 0 | $I_2$ | $I_1$ | Ipk | $I_1$ | $I_2$ |
| | V_R | $I_1$ | Ipk | $I_1$ | $I_2$ | 0 | $-I_2$ | $-I_1$ | $-Ipk$ | $-I_1$ | $-I_2$ | 0 | $I_2$ |
| | W_R | $-I_1$ | $-I_2$ | 0 | $I_2$ | $I_1$ | Ipk | $I_1$ | $I_2$ | 0 | $-I_2$ | $-I_1$ | $-Ipk$ |

At an electrical angle of 0°, a current does not flow to the U-phase winding M1. A current having a value of $I_1$ flows from the bridge circuit R to the bridge circuit L through the V-phase winding M2, and a current having a value of $I_1$ flows from the bridge circuit L to the bridge circuit R through the W-phase winding M3.

At an electrical angle of 30°, a current having a value of $I_2$ flows from the bridge circuit L to the bridge circuit R through the U-phase winding M1, a current having a value of Ipk flows from the bridge circuit R to the bridge circuit L through the V-phase winding M2, and a current having a value of $I_2$ flows from the bridge circuit L to the bridge circuit R flows through the W-phase winding M3.

At an electrical angle of 60°, a current having a value of $I_1$ flows from the bridge circuit L to the bridge circuit R through the U-phase winding M1, and a current having a value of $I_1$ flows from the bridge circuit R to the bridge circuit L through the V-phase winding M2. A current does not flow through the W-phase winding M3.

At an electrical angle of 90°, a current having a value of Ipk flows from the bridge circuit L to the bridge circuit R through the U-phase winding M1, a current having a value of $I_2$ flows from the bridge circuit R to the bridge circuit L through the V-phase winding M2, and a current having a value of $I_2$ flows from the bridge circuit R to the bridge circuit L through the W-phase winding M3.

At an electrical angle of 120°, a current having a value of $I_1$ flows from the bridge circuit L to the bridge circuit R through the U-phase winding M1, and a current having a value of $I_1$ flows from the bridge circuit R to the bridge circuit L through the W-phase winding M3. A current does not flow through the V-phase winding M2.

At an electrical angle of 150°, a current having a value of $I_2$ flows from the bridge circuit L to the bridge circuit R through the U-phase winding M1, a current having a value of $I_2$ flows from the bridge circuit L to the bridge circuit R through the V-phase winding M2, and a current having a value of Ipk flows from the bridge circuit R to the bridge circuit L through the W-phase winding M3.

At an electrical angle of 180°, a current does not flow through the U-phase winding M1. A current having a value of $I_1$ flows from the bridge circuit L to the bridge circuit R through the V-phase winding M2, and a current having a value of $I_1$ flows from the bridge circuit R to the bridge circuit L through the W-phase winding M3.

At an electrical angle of 210°, a current having a value of $I_2$ flows from the bridge circuit R to the bridge circuit L through the U-phase winding M1, a current having a value of Ipk flows from the bridge circuit L to the bridge circuit R through the V-phase winding M2, and a current having a value of $I_2$ flows from the bridge circuit R to the bridge circuit L through the W-phase winding M3.

At an electrical angle of 240°, a current having a value of $I_1$ flows from the bridge circuit R to the bridge circuit L through the U-phase winding M1, and a current having a value of $I_1$ flows from the bridge circuit L to the bridge circuit R through the V-phase winding M2. A current does not flow through the W-phase winding M3.

At an electrical angle of 270°, a current having a value of Ipk flows from the bridge circuit R to the bridge circuit L through the U-phase winding M1, a current having a value of I2 flows from the bridge circuit L to the bridge circuit R through the V-phase winding M2, and a current having a value of $I_2$ flows from the bridge circuit L to the bridge circuit R through the W-phase winding M3.

At an electrical angle of 300°, a current having a value of $I_1$ flows from bridge circuit R to the bridge circuit L through the U-phase winding M1, and a current having a value of $I_1$ flows from bridge circuit L to the bridge circuit R through the W-phase winding M3. A current does not flow through the V-phase winding M2.

At an electrical angle of 330°, a current having a value of $I_2$ flows from the bridge circuit R to the bridge circuit L through the U-phase winding M1, a current having a value of $I_2$ flows from the bridge circuit R to the bridge circuit L through the V-phase winding M2, and a current having a value of Ipk flows from the bridge circuit L to the bridge circuit R through the W-phase winding M3.

In accordance with the three-phase energization control according to the present example embodiment, the sum of the currents flowing to the three-phase windings with consideration for the direction of the current is constantly "0" for every electrical angle. For example, the control circuit 300 controls the switching operation of each FET of the bridge circuits L and R through PWM control such that the current waveforms illustrated in FIG. 7 are obtained.

Next, the arrangement position of the first and second inverters 110 and 140 on the substrate 50 (FIG. 1) will be described.

Figure 8:
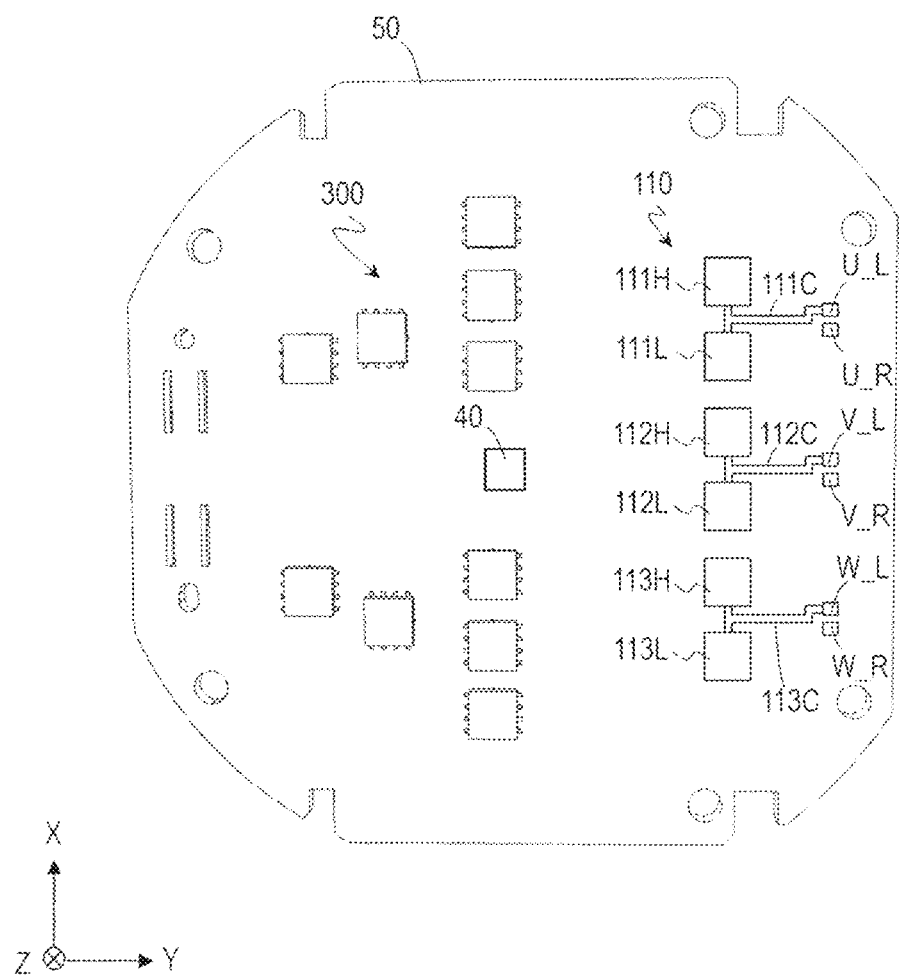
FIG. 8 is a diagram illustrating a lower surface of a substrate according to an example embodiment of the present disclosure.
Figure 9:
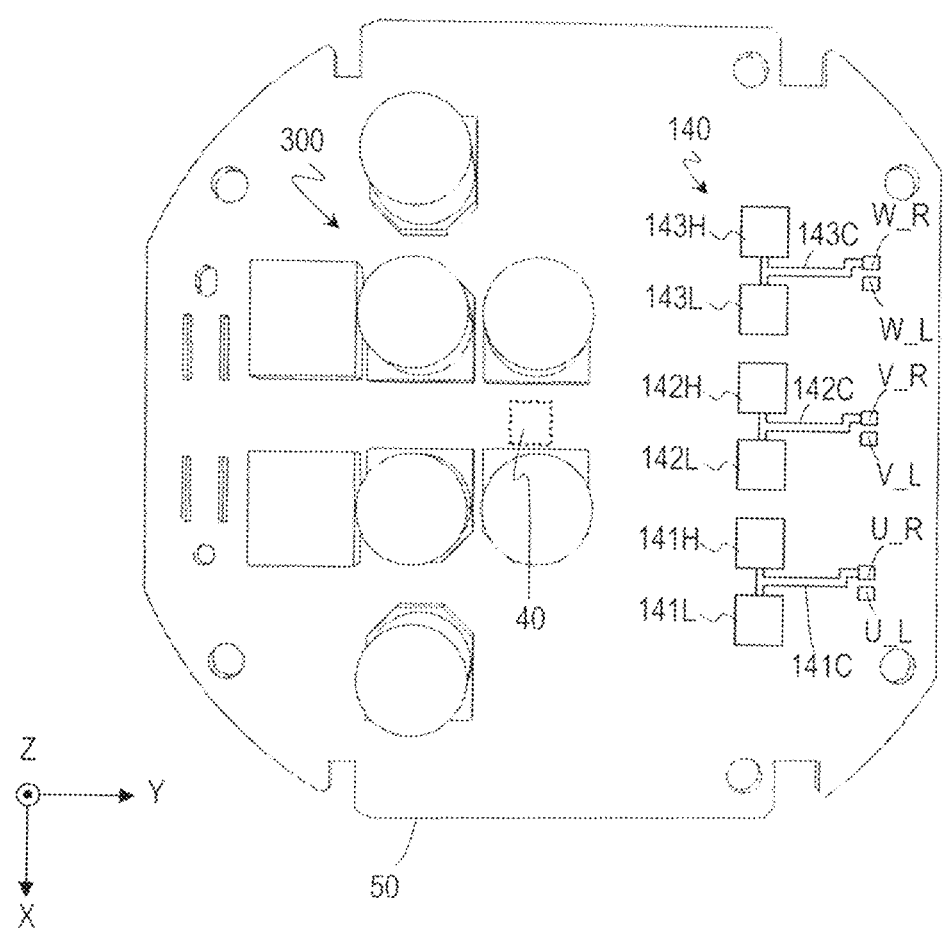
FIG. 9 is a diagram illustrating a diagram illustrating an upper surface of a substrate according to an example embodiment of the present disclosure.

FIG. 8 is a diagram illustrating a lower surface of the substrate 50, and FIG. 9 is a diagram illustrating an upper surface of the substrate 50. FIG. 8 illustrates the substrate 50 when the substrate 50 is viewed from the bottom in FIG. 1. FIG. 9 illustrates the substrate 50 when the substrate 50 is viewed from the top in FIG. 1. In the present example embodiment, the first inverter 110 is disposed on the lower surface of the substrate 50, and the second inverter 140 is disposed on the upper surface of the substrate 50. The power conversion device 100 and various other electronic circuits may be mounted on the substrate 50. In order to facilitate easier understanding of the features of the present example embodiment, only a part of the constituent elements mounted on the substrate 50 is illustrated in FIGS. 8 and 9. In the following drawings, only a part of the constituent elements mounted on the substrate 50 is illustrated in order to facilitate easier understanding of the features of the present example embodiment.

The FETs 111H, 111L, 112H, 112L, 113H and 113L of the first inverter 110 are arranged on the lower surface of the substrate 50. The FETs 143H, 143L, 142H, 142L, 141H, and 141L of the second inverter 140 are arranged on the upper surface of the substrate 50. The terminals U_L, U_R, V_L, V_R, W_L, and W_R of the first and second inverters 110 and 140 are arranged on the substrate 50. The terminals may be arranged on any surface of the upper surface and the lower surface on which the FETs are arranged, or may be arranged on both the upper surface and the lower surface of the substrate 50 while penetrating the substrate 50 in the Z direction.

The FETs 111H and 111L and the terminal U_L are connected via a conductive line 111C. The FETs 112H and 112L and the terminal V_L are connected via a conductive line 112C. The FETs 113H and 113L and the terminal W_L are connected via a conductive line 113C.

The FETs 141H and 141L and the terminal U_R are connected via a conductive line 141C. The FETs 142H and 142L and the terminal V_R are connected via a conductive line 142C. The FETs 143H and 143L and the terminal W_R are connected via a conductive line 143C.

Figure 10:
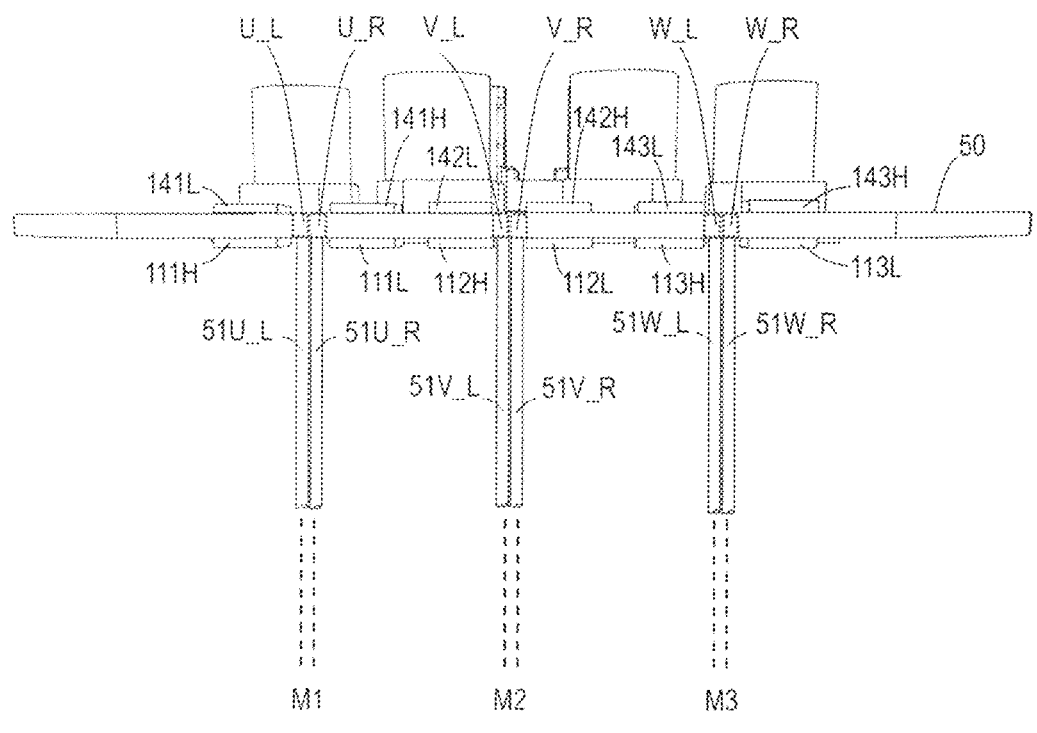
FIG. 10 is a diagram illustrating a substrate according to an example embodiment of the present disclosure.

FIG. 10 is a view illustrating the substrate 50 when viewed in a Y direction. The motor 10 includes electrical wires 51U_L, 51U_R, 51V_L, 51V_R, 51W_L, and 51W_R, as the electrical wires 51 (FIG. 1). In this example, the electrical wires 51U_L and 51U_R are end portions of the U-phase winding M1. The electrical wires 51V_L and 51V_R are end portions of the V-phase winding M2. The electrical wires 51W_L and 51W_R are end portions of the W-phase winding M3. In addition, each electrical wire and each winding may be separate members. The electrical wire 51U_L is connected to the terminal U_L. The electrical wire 51U_R is connected to the terminal U_R. The electrical wire 51V_L is connected to the terminal V_L. The electrical wire 51V_R is connected to the terminal V_R. The electrical wire 51W_L is connected to the terminal W_L. The electrical wire 51W_R is connected to the terminal W_R.

Figure 11:
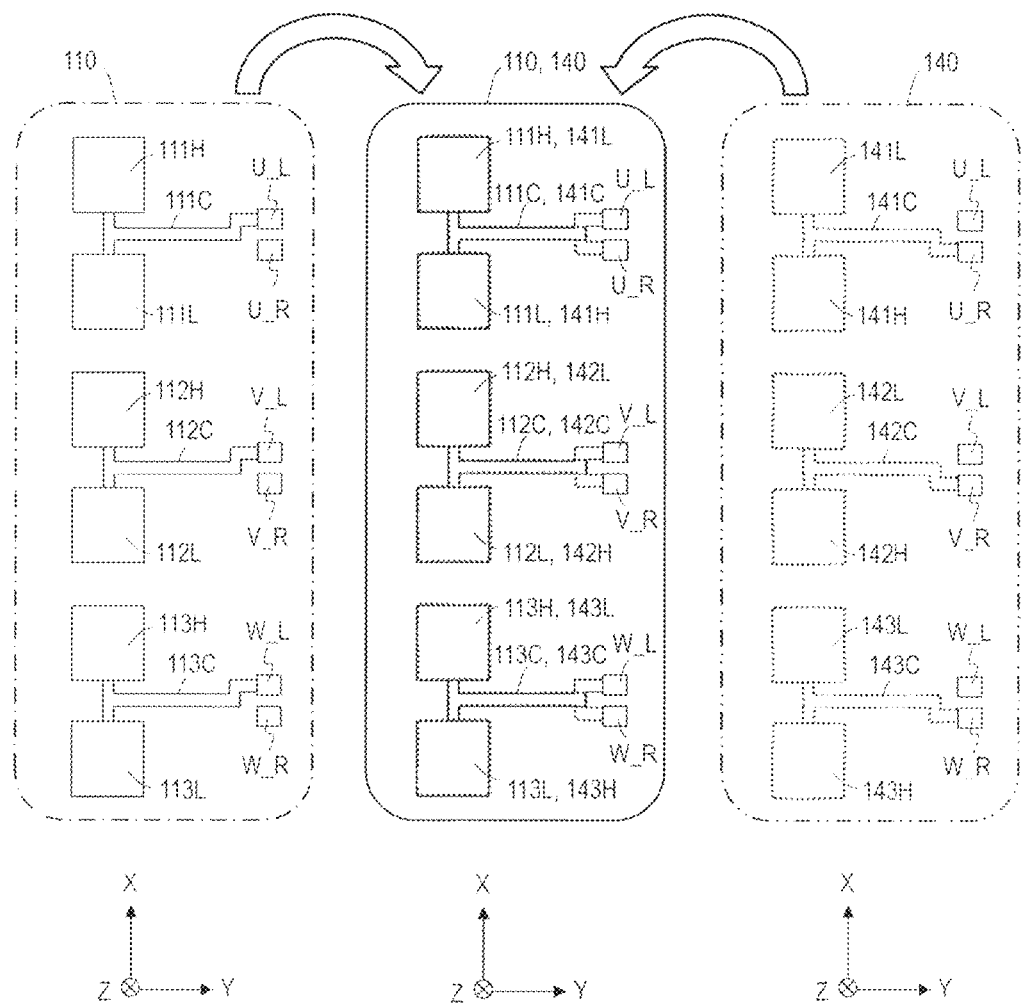
FIG. 11 is a diagram illustrating a positional relationship between a first inverter and a second inverter according to an example embodiment of the present disclosure.
Figure 12:
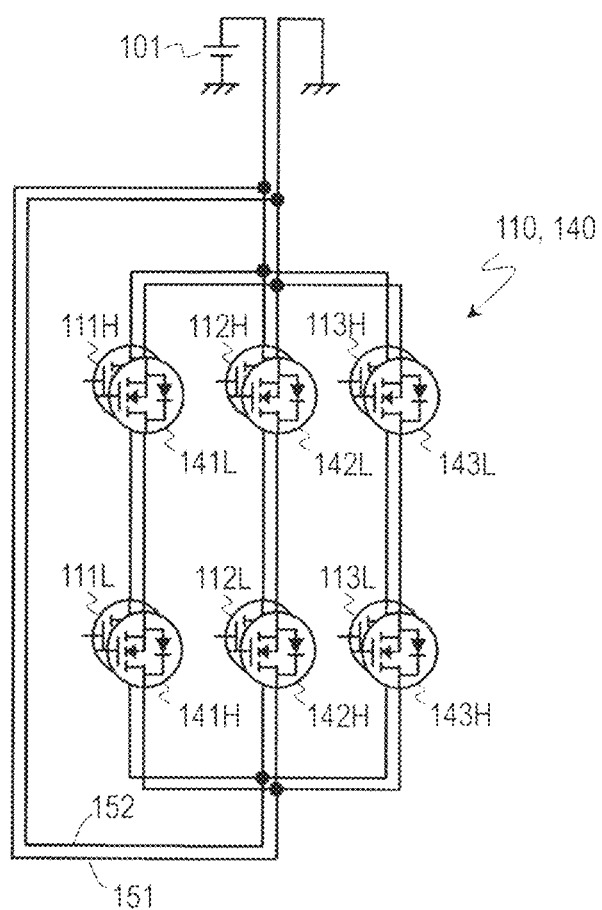
FIG. 12 is a schematic diagram illustrating a circuit configuration in which the first inverter and the second inverter overlap with each other according to an example embodiment of the present disclosure.

FIG. 11 illustrates a positional relationship between the first inverter 110 and the second inverter 140 when the substrate 50 is viewed from the bottom in FIG. 1. FIG. 11 is a diagram of the substrate 50 when viewed from the bottom, and an arrangement pattern of the FETs of the second inverter 140 is upside down on the paper in FIG. 9 and FIG. 11. FIG. 12 is a schematic diagram illustrating a circuit configuration in which the first inverter 110 and the second inverter 140 overlap with each other.

A dashed-dotted box on a left side of FIG. 11 indicates the first inverter 110. A dashed double-dotted box on a right side of FIG. 11 indicates the second inverter 140. A solid box at the center of FIG. 11 indicates a positional relationship between the first inverter 110 and the second inverter 140 on the substrate 50. As illustrated in FIG. 11, the first inverter 110 and the second inverter 140 overlap each other in the Z direction. In this example, the Z direction is parallel to a rotation axis direction of the motor 10.

More specifically, the FET 111H and the FET 141L overlap each other in the Z direction. The FET 111L and the FET 141H overlap each other in the Z direction. The FET 112H and the FET 142L overlap each other in the Z direction. The FET 112L and the FET 142H overlap each other in the Z direction. The FET 113H and the FET 143L overlap each other in the Z direction. The FET 113L and the FET 143H overlap each other in the Z direction.

As illustrated in FIG. 10, the FETs overlapping each other in the Z direction are arranged adjacent to each other with the substrate 50 interposed therebetween. For example, a case where the FETs are adjacent to each other means that the FETs are more adjacent to each other than the other FETs. In addition, the case where the FETs are adjacent to each other does not exclude that another constituent element is not disposed between the FETs adjacent to each other.

As the FETs overlap in the Z direction, the conductive lines connected to the overlapping FETs also overlap each other. For example, the conductive line 111C and the conductive line 141C overlap each other in the Z direction. The conductive line 112C and the conductive line 142C overlap each other in the Z direction. The conductive line 113C and the conductive line 143C overlap each other in the Z direction. For example, as illustrated in FIG. 12, a power supply line 151 and a GND line 152 connected to the first and second inverters 110 and 140 also overlap each other in the Z direction. In FIG. 12, the positions of the first inverter 110 and the second inverter 140 are slightly shifted in order to facilitate easier understanding of the features of the present example embodiment.

A flow of the currents in the motor 10 will be described with reference to FIGS. 2, 10, and 11.

First, the current flowing through the U-phase winding M1 will be described. As described above, at least a part of the current flowing from the FET 111H to the winding M1 flows to the FET 141L. In addition, at least a part of the current flowing from the FET 141H to the winding M1 flows to the FET 111L.

As stated above, the orientations of the current flowing through the FET 111H and the current flowing through the FET 141L are opposite to each other. That is, the orientations of the magnetic field generated by the current flowing through the FET 111H and the magnetic field generated by the current flowing through the FET 141L are opposite to each other. In the present example embodiment, the FET 111H and the FET 141L are arranged adjacent to each other on the substrate 50. Thus, the magnetic fields of which the orientations are opposite are offset. Accordingly, it is possible to reduce the influence of the magnetic fields generated by the currents flowing through the FET 111H and the FET 141L on the surrounding electronic components. For example, it is possible to reduce the influence of the magnetic fields generated by the currents flowing through the FET 111H and the FET 141L on the magnetic sensor 40. Accordingly, it is possible to enhance the detection accuracy of the magnetic sensor, and it is possible to prevent the torque ripple from increasing or a reduction in output from decreasing.

Further, as the FET 111H and the FET 141L are arranged adjacent to each other, the conductive line connected to the FET 111H and the conductive line connected to the FET 141L are arranged adjacent to each other. In the adjacent conductive lines, currents of which the orientations are opposite to each other flow. However, since the conductive lines are adjacent to each other, the generated magnetic fields are offset. Accordingly, it is possible to reduce the influence of the generated magnetic fields on the surrounding electronic components. For example, it is possible to reduce the influence of the generated magnetic fields on the magnetic sensor 40.

Similar to the relationship between the FETs 111H and 141L, the orientations of the current flowing through the FET 141H and the current flowing through the FET 111L are opposite to each other. However, since the FET 141H and the FET 111L are adjacent to each other, the generated magnetic fields are offset. Further, the conductive line connected to the FET 141H and the conductive line connected to the FET 111L are arranged adjacent to each other. Thus, the magnetic fields generated by the currents flowing through the conductive lines are offset. Accordingly, it is possible to reduce the influence of the generated magnetic fields on the surrounding electronic components. For example, it is possible to reduce the influence of the generated magnetic fields on the magnetic sensor 40.

A case where "the magnetic fields are offset" is not limited to a case where the magnetic fields are completely offset, and includes a case where a part of the generated magnetic fields is offset.

Next, the current flowing through the V-phase winding M2 will be described. As mentioned above, at least a part of the current flowing from FET 112H to winding M2 flows to FET 142L. In addition, at least a part of the current flowing from the FET 142H to the winding M2 flows through the winding M2, and flows to the FET 112L.

As stated above, the orientations of the current flowing through the FET 112H and the current flowing through the FET 142L are opposite to each other. That is, the orientations of the magnetic field generated by the current flowing through the FET 112H and the magnetic field generated by the current flowing through the FET 142L are opposite to each other. In the present example embodiment, the FET 112H and the FET 142L are arranged adjacent to each other on the substrate 50. Thus, the magnetic fields of which the orientations are opposite are offset. Accordingly, it is possible to reduce the influence of the magnetic fields generated by the currents flowing through the FETs 112H and 142L on the surrounding electronic components. For example, it is possible to reduce the influence of the magnetic fields generated by the currents flowing through the FET 112H and the FET 142L on the magnetic sensor 40. Accordingly, it is possible to enhance the detection accuracy of the magnetic sensor, and it is possible to prevent the torque ripple from increasing or a reduction in output from decreasing.

Further, as the FET 112H and the FET 142L are arranged adjacent to each other, the conductive line connected to the FET 112H and the conductive line connected to the FET 142L are arranged adjacent to each other. In the adjacent conductive lines, currents of which the orientations are opposite to each other flow. However, since the conductive lines are adjacent to each other, the generated magnetic fields are offset. Accordingly, it is possible to reduce the influence of the generated magnetic fields on the surrounding electronic components. For example, it is possible to reduce the influence of the generated magnetic fields on the magnetic sensor 40.

Similar to the relationship between the FETs 112H and 142L, the orientations of the current flowing through the FET 142H and the current flowing through the FET 112L are opposite to each other. However, since the FET 142H and the FET 112L are adjacent to each other, the generated magnetic fields are offset. Further, the conductive line connected to the FET 142H and the conductive line connected to the FET 112L are arranged adjacent to each other. Thus, the magnetic fields generated by the currents flowing through the conductive lines are offset. Accordingly, it is possible to reduce the influence of the generated magnetic fields on the surrounding electronic components. For example, it is possible to reduce the influence of the generated magnetic fields on the magnetic sensor 40.

Next, the current flowing through the W-phase winding M3 will be described. As described above, at least a part of the current flowing from the FET 113H to the winding M3 flows to the FET 143L. In addition, at least a part of the current flowing from the FET 143H to the winding M3 flows to the FET 113L.

As stated above, the orientations of the current flowing through the FET 113H and the current flowing through the FET 143L are opposite to each other. That is, the orientations of the magnetic field generated by the current flowing through the FET 113H and the magnetic field generated by the current flowing through the FET 143L are opposite to each other. In the present example embodiment, the FET 113H and the FET 143L are arranged adjacent to each other on the substrate 50. Thus, the magnetic fields of which the orientations are opposite are offset. Accordingly, it is possible to reduce the influence of the magnetic fields generated by the currents flowing through the FET 113H and the FET 143L on the surrounding electronic components. For example, it is possible to reduce the influence of the magnetic fields generated by the current flowing through the FET 113H and the FET 143L on the magnetic sensor 40. Accordingly, it is possible to enhance the detection accuracy of the magnetic sensor, and it is possible to prevent the torque ripple from increasing or a reduction in output from decreasing.

Further, as the FET 113H and the FET 143L are arranged adjacent to each other, the conductive line connected to the FET 113H and the conductive line connected to the FET 143L are arranged adjacent to each other. In the adjacent conductive lines, currents of which the orientations are opposite to each other flow. However, since the conductive lines are adjacent to each other, the generated magnetic fields are offset. Accordingly, it is possible to reduce the influence of the generated magnetic fields on the surrounding electronic components. For example, it is possible to reduce the influence of the generated magnetic fields on the magnetic sensor 40.

Similar to the relationship between the FETs 113H and 143L, the orientations of the current flowing through the FET 143H and the current flowing through the FET 113L are opposite to each other. However, since the FET 143H and the FET 113L are adjacent to each other, the generated magnetic fields are offset. Further, the conductive line connected to the FET 143H and the conductive line connected to the FET 113L are arranged adjacent to each other. Thus, the magnetic fields generated by the currents flowing through the conductive lines are offset. Accordingly, it is possible to reduce the influence of the generated magnetic fields on the surrounding electronic components. For example, it is possible to reduce the influence of the generated magnetic fields on the magnetic sensor 40.

Figure 13:
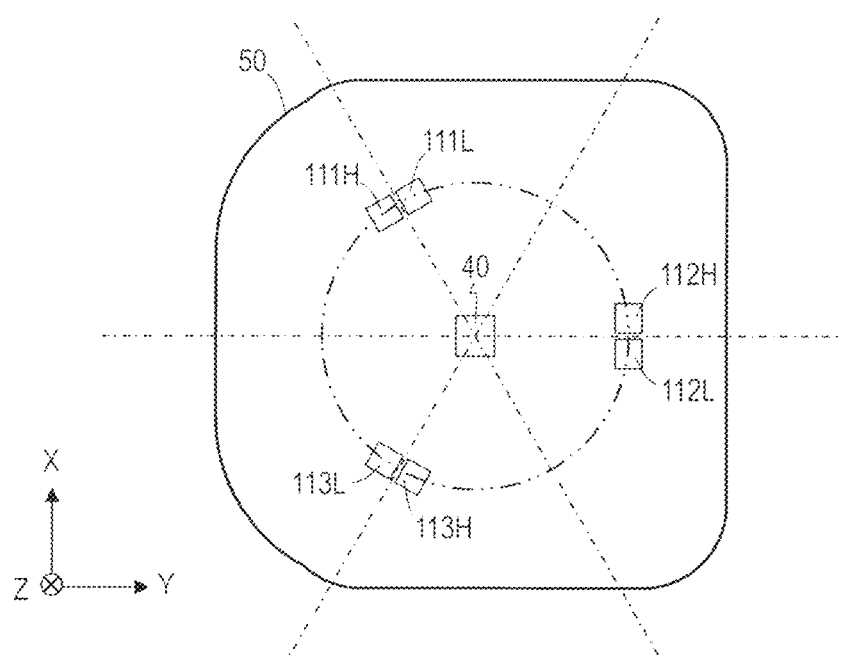
FIG. 13 is a diagram illustrating another example of an arrangement position of the first inverter on the substrate according to an example embodiment of the present disclosure.
Figure 14:
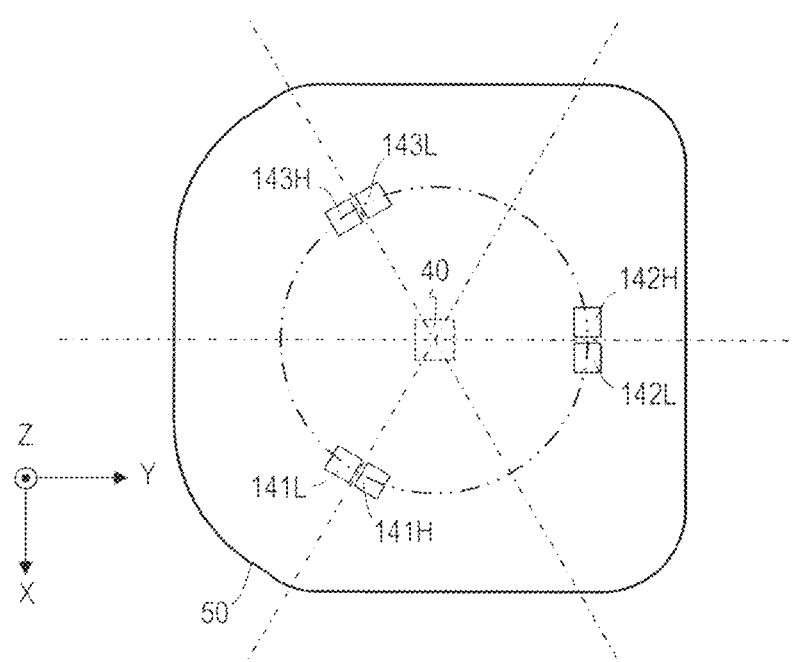
FIG. 14 is a diagram illustrating another example of an arrangement position of the second inverter on the substrate according to an example embodiment of the present disclosure.

FIGS. 13 and 14 are diagrams illustrating another example of the arrangement position of the first and second inverters 110 and 140 on the substrate 50. FIG. 13 is a diagram illustrating the lower surface of the substrate 50, and FIG. 14 is a diagram illustrating the upper surface of the substrate 50. FIG. 13 illustrates the substrate 50 when the substrate 50 is viewed from the bottom in FIG. 1. FIG. 14 illustrates the substrate 50 when the substrate 50 is viewed from the top in FIG. 1.

In the example illustrated in FIGS. 13 and 14, the FET connected to the U-phase winding M1, the FET connected to the V-phase winding M2, and the FET connected to the W-phase winding M3 are arranged concentrically at intervals of 120°.

In the arrangement example illustrated in FIGS. 13 and 14, the FET 111H and the FET 141L overlap each other in the Z direction. The FET 111L and the FET 141H overlap each other in the Z direction. The FET 112H and the FET 142L overlap each other in the Z direction. The FET 112L and the FET 142H overlap each other in the Z direction. The FET 113H and the FET 143L overlap each other in the Z direction. The FET 113L and the FET 143H overlap each other in the Z direction. Therefore, in the arrangement example illustrated in FIGS. 13 and 14, the same effects as the effects described with reference to FIGS. 8 to 12 can be obtained.

Further, as in the related art, when a failure of the switching elements of two inverters is detected, motor control may be switched from normal control to abnormal control. In the abnormal control, a neutral point of the winding is formed in the failure inverter by turning on and off the switching elements according to a predetermined rule. The motor drive can be continued using this neutral point and the normal inverter. In the present example embodiment, in the control using such a neutral point, currents of which the orientations are opposite to each other also flow to the above-described adjacent FETs. Thus, the generated magnetic fields are offset. In the present example embodiment, in the abnormal control, it is also possible to reduce the influence of the magnetic field generated by the drive current of the motor 10 on the surrounding electronic components.

In general, a vehicle such as an automobile includes an electric power steering device. The electric power steering device generates an assist torque for assisting a steering torque of a steering system generated by a driver operating a steering wheel. The assist torque is generated by an assist torque mechanism, and can reduce the burden of the driver's operation. For example, the assist torque mechanism includes a steering torque sensor, an ECU, a motor, and a deceleration mechanism. The steering torque sensor detects the steering torque of the steering system. The ECU generates a drive signal based on a detection signal of the steering torque sensor. The motor generates an assist torque corresponding to the steering torque based on the drive signal, and transmits the assist torque to the steering system via the deceleration mechanism.

Figure 15:
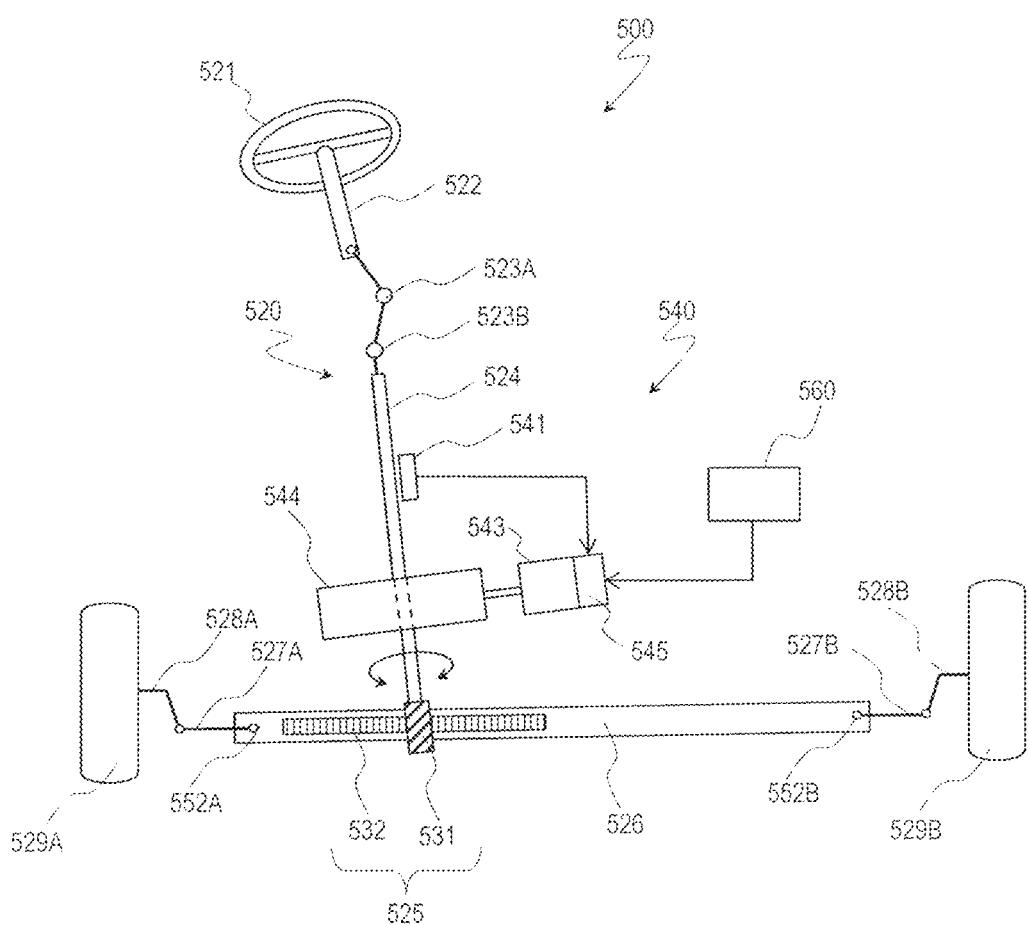
FIG. 15 is a schematic diagram illustrating an electric power steering device according to an example embodiment of the present disclosure.

The motor 10 of the present disclosure is suitably used for the electric power steering device. FIG. 15 is a schematic diagram illustrating an electric power steering device 500 according to the present example embodiment. The electric power steering device 500 includes a steering system 520 and an assist torque mechanism 540.

The steering system 520 includes, for example, a steering wheel 521, a steering shaft 522 (also referred to as a "steering column"), universal joints 523A and 523B, a rotational shaft 524 (also referred to as a "pinion shaft" or an "input shaft"), a rack and pinion mechanism 525, a rack shaft 526, right and left ball joints 552A and 552B, tie rods 527A and 527B, knuckles 528A and 528B, and right and left steered wheels (for example, right and left front wheels) 529A and 529B. The steering wheel 521 is connected to the rotational shaft 524 via the steering shaft 522 and the universal joints 523A and 523B. The rack shaft 526 is connected to the rotational shaft 524 via the rack and pinion mechanism 525. The rack and pinion mechanism 525 includes a pinion 531 provided at the rotational shaft 524 and a rack 532 provided at the rack shaft 526. The right steered wheel 529A is connected to a right end of the rack shaft 526 via the ball joint 552A, the tie rod 527A and the knuckle 528A in this order. Similar to the right side, the left steered wheel 529B is connected to a left end of the rack shaft 526 via the ball joint 552B, the tie rod 527B, and the knuckle 528B in this order. In FIG. 15, the right side and the left side respectively correspond to the right side and the left side when viewed from the driver who seats in the seat.

According to the steering system 520, the driver operates the steering wheel 521, and thus, the steering torque is generated. The generated steering torque is transmitted to the right and left steered wheels 529A and 529B via the rack and pinion mechanism 525. Accordingly, the driver can operate the right and left steered wheels 529A and 529B.

The assist torque mechanism 540 includes, for example, a steering torque sensor 541, an electromechanical motor 543, and a deceleration mechanism 544. The assist torque mechanism 540 applies the assist torque to the steering system 520 from the steering wheel 521 to the right and left steered wheels 529A and 529B. The assist torque may be referred to as an "additional torque".

The motor 10 according to the example embodiment can be suitably used as the electromechanical motor 543. The electromechanical motor 543 includes a power conversion device 545. The power conversion device 100 according to the example embodiment can be used as the power conversion device 545. Further, the control circuit 300 according to the example embodiment can be used as an ECU.

The steering torque sensor 541 detects the steering torque of the steering system 520 applied by the steering wheel 521. The control circuit 300 generates a drive signal for driving the motor 543 based on a detection signal (hereinafter, referred to as a "torque signal") from the steering torque sensor 541. The motor 543 generates an assist torque corresponding to the steering torque based on the drive signal. The assist torque is transmitted to the rotational shaft 524 of the steering system 520 via the deceleration mechanism 544.

The deceleration mechanism 544 is, for example, a worm gear mechanism. The assist torque is further transmitted from the rotational shaft 524 to the rack and pinion mechanism 525.

The electric power steering device 500 can be classified into a pinion assist type, a rack assist type, and a column assist type according to portions at which the assist torque is applied to the steering system 520. A pinion assist type electric power steering device 500 is illustrated in FIG. 15. However, the electric power steering device 500 may be the rack assist type or the column assist type.

For example, not only the torque signal but also a vehicle speed signal may be input to the control circuit 300. An external device 560 is, for example, a vehicle speed sensor. Alternatively, the external device 560 may be, for example, another ECU that can communicate in an in-vehicle network such as Controller Area Network (CAN). The microcontroller of the control circuit 300 can perform vector control or PWM control of the motor 543 based on the torque signal or the vehicle speed signal.

The control circuit 300 sets a target current value based on at least the torque signal. It is preferable that the control circuit 300 sets the target current value with consideration for the vehicle speed signal detected by the vehicle speed sensor and the rotation signal of the rotor detected by the angle sensor 320. The control circuit 300 can control the drive signal of the motor 543, that is, the drive current such that the actual current value detected by the current sensor 170 coincides with the target current value.

According to the electric power steering device 500, the right and left steered wheels 529A and 529B can be operated by the rack shaft 526 by using a combined torque obtained by adding the assist torque of the motor 543 to the steering torque of the driver.

The example embodiments according to the present disclosure have been described above. The aforementioned description of the example embodiments is merely an example, and does not limit the technology of the present disclosure. In addition, an example embodiment in which the constituent elements described in the above-described example embodiments are appropriately combined is possible.

The example embodiments of the present disclosure can be widely used in various devices including various motors such as vacuum cleaners, dryers, ceiling fans, washing machines, refrigerators, and electric power steering devices.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:
1. A motor comprising:
n-phase windings, n being an integer of 3 or more;
a first inverter that is electrically connected to a first end of each of the n-phase windings; and
a second inverter that is electrically connected to a second end of each of the n-phase windings; wherein
each of the first inverter and the second inverter includes a plurality of low-side switching elements and a plurality of high-side switching elements;
the n-phase windings include a first-phase winding;
a first low-side switching element and a first high-side switching element of the first inverter are electrically connected to a first end of the first-phase winding;

a second low-side switching element and a second high-side switching element of the second inverter are electrically connected to a second end of the first-phase winding;

at least a portion of a current flowing from the first high-side switching element of the first inverter to the first-phase winding flows to the second low-side switching element of the second inverter; and the first high-side switching element of the first inverter and the second low-side switching element of the second inverter are adjacent to each other.

2. The motor according to claim 1, wherein a direction of the current flowing from the first high-side switching element to the first-phase winding and a direction of the current flowing from the first-phase winding to the second low-side switching element are opposite to each other.

3. The motor according to claim 1, wherein at least a portion of a wiring electrically connected to the first high-side switching element and at least a portion of a wiring electrically connected to the second low-side switching element are adjacent to each other.

4. The motor according to claim 1, further comprising:
a substrate at which the first inverter and the second inverter are provided; wherein
the first inverter is provided on a first surface of the substrate, and the second inverter is provided on a second surface of the substrate.

5. The motor according to claim 1, wherein the first high-side switching element and the second low-side switching element overlap each other in a rotation axis direction of the motor.

6. The motor according to claim 1, further comprising:
a rotor; and
a magnetic sensor to detect a rotational angle of the rotor.

7. The motor according to claim 1, wherein
at least a portion of a current flowing from the second high-side switching element of the second inverter to the first-phase winding flows to the first low-side switching element of the first inverter; and
the first low-side switching element of the first inverter and the second high-side switching element of the second inverter are adjacent to each other.

8. The motor according to claim 1, wherein
the n-phase windings includes a second-phase winding;
a third low-side switching element and a third high-side switching element of the first inverter are electrically connected to a first end of the second-phase winding;

a fourth low-side switching element and a fourth high-side switching element of the second inverter are electrically connected to a second end of the second-phase winding;

at least a portion of a current flowing from the third high-side switching element of the first inverter to the second-phase winding flows to the fourth low-side switching element of the second inverter;

at least a portion of a current flowing from the fourth high-side switching element of the second inverter to the second-phase winding flows to the third low-side switching element of the first inverter;

the third high-side switching element of the first inverter and the fourth low-side switching element of the second inverter are adjacent to each other; and the third low-side switching element of the first inverter and the fourth high-side switching element of the second inverter are adjacent to each other.

9. The motor according to claim 1, wherein
the n-phase windings include a third-phase winding;
a fifth low-side switching element and a fifth high-side switching element of the first inverter are electrically connected to a first end of the third-phase winding;

a sixth low-side switching element and a sixth high-side switching element of the second inverter are electrically connected to a second end of the third-phase winding;

at least a portion of a current flowing from the fifth high-side switching element of the first inverter to the third-phase winding flows to the sixth low-side switching element of the second inverter;

at least a portion of a current flowing from the sixth high-side switching element of the second inverter to the third-phase winding flows to the fifth low-side switching element of the first inverter;

the fifth high-side switching element of the first inverter and the sixth low-side switching element of the second inverter are adjacent to each other; and the fifth low-side switching element of the first inverter and the sixth high-side switching element of the second inverter are adjacent to each other.

10. An electric power steering device comprising the motor according to claim 1.

* * * * *